United States Patent [19]

Blaser

[11] Patent Number: 5,109,969
[45] Date of Patent: May 5, 1992

[54] JAW CLUTCH

[75] Inventor: Peter T. Blaser, Dielheim, Fed. Rep. of Germany

[73] Assignee: Heidelberger Druckmaschinen AG, Heidelberg, Fed. Rep. of Germany

[21] Appl. No.: 605,178

[22] Filed: Oct. 25, 1990

[30] Foreign Application Priority Data

Oct. 25, 1989 [DE] Fed. Rep. of Germany ....... 3935450

[51] Int. Cl.$^5$ .............................................. F16D 27/00
[52] U.S. Cl. .............................. 192/84 R; 192/103 R; 74/339
[58] Field of Search ............... 192/84 P, 84 R, 103 R; 74/339

[56] References Cited

U.S. PATENT DOCUMENTS 2,536,897  1/1951  Wood ..................... 74/339
4,817,470  4/1989  Müller et al. ............ 74/339 X

FOREIGN PATENT DOCUMENTS

| 0232625 | 8/1987 | European Pat. Off. . |
| 0201570 | 4/1989 | European Pat. Off. . |
| 2343648 | 3/1975 | Fed. Rep. of Germany . |
| 2943493 | 8/1980 | Fed. Rep. of Germany . |
| 1177826 | 4/1959 | France .............. 192/84 P |
| 460997 | 2/1937 | United Kingdom . |
| 482568 | 3/1938 | United Kingdom . |
| 721910 | 1/1955 | United Kingdom . |
| 991782 | 5/1965 | United Kingdom . |
| 2038440 | 7/1980 | United Kingdom . |

OTHER PUBLICATIONS

Lueger: Lexikon der Technik, vol. 7, Deutsche-Verlags-Anstalt, Stuttgart, 1965, p. 593.
Hoffmann, Herbert: Diedigitale Winkelgleichauf-regelung in der Antriebstechnik, in: automatic, Jan. 1972, pp. 4–7.

Primary Examiner—Leslie A. Braun
Assistant Examiner—Andrea Pitts
Attorney, Agent, or Firm—Herbert L. Lerner; Laurence A. Greenberg

[57] ABSTRACT

A clutch device for phase-synchronous coupling of rotating machine elements, includes two coding elements, respectively, co-rotatable with two driven machine elements, a sensor fixed in position adjacent the coding elements, the coding elements having codings thereon which are variable in angular position with respect to the sensor, the sensor having a device for registering information composed from respective codings of the two coding elements, and a clutch control unit connected to the sensor for receiving the information therefrom.

22 Claims, 6 Drawing Sheets

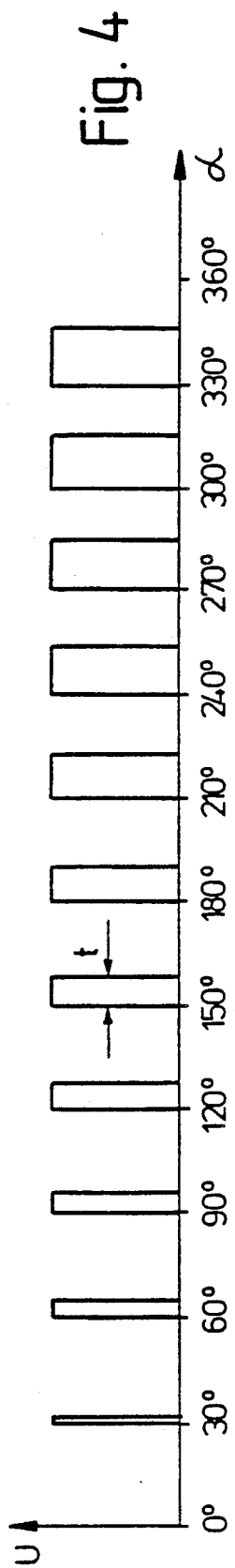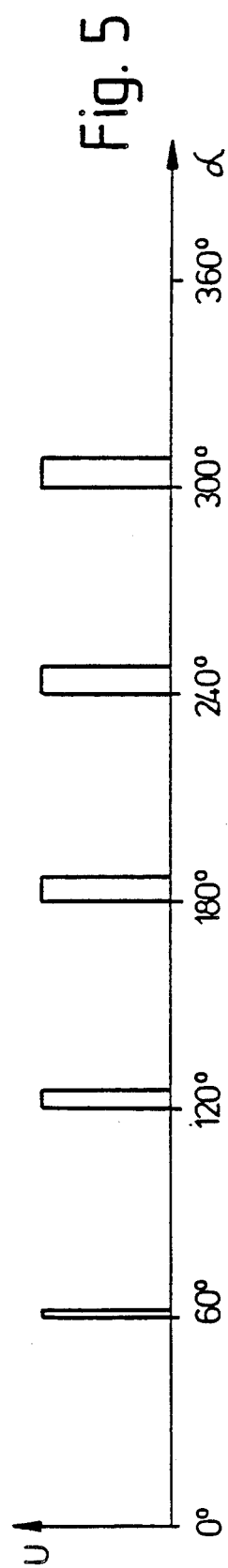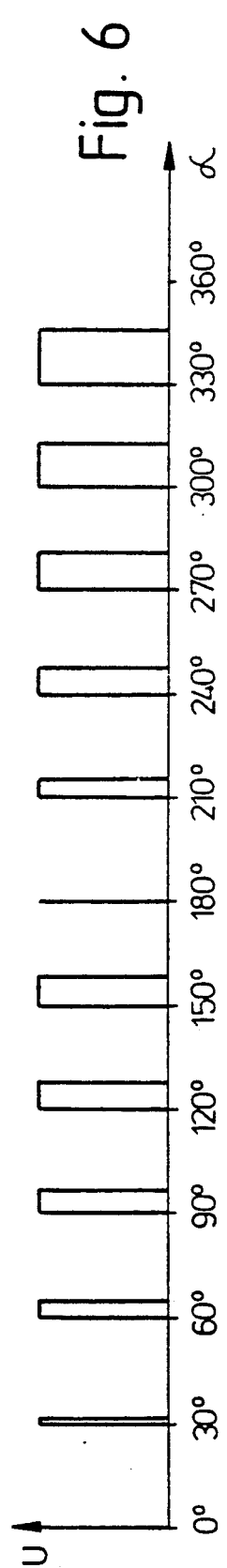

JAW CLUTCH

The invention relates to a clutch or coupling device for phase-synchronous coupling of rotating machine elements, in particular, those of a printing machine, and method of operation thereof. The term "phase-synchronous" is understood to mean that a clutch connects a pair of machine elements which have the same rotary speed, respectively, and have a given mutual, relative angular position.

In machine construction, and especially in the construction of printing machines, as well, a problem occurs when coupling two rotating machine elements to one another. A requirement often exists that the machine elements must assume a quite specific angular position with respect to one another for coupling. This applies, for example, in the case of so-called toothed or jaw clutches, which engage only in one quite specific position. From a constructive standpoint, the jaw clutch is provided for this purpose, for example, with teeth of different construction, which effect a form-locking closure with corresponding opposite teeth only in one relative position of the two coupling halves.

A form-locking connection is one which connects two elements together due to the shape of the elements themselves, as opposed to a force-locking connection, which locks the elements together by force external to the elements.

In many applications, it is not possible to couple a driven machine element with another, stationary or only very slow-moving machine element by means of a clutch of this type, because it is necessary to overcome excessively high rotational-speed differentials, and/or to accelerate masses which are too large. The abruptly engaging jaw clutch springs open again due to impermissibly large torque-producing impacts which are thereby generated. The engaging moment or torque of the clutch is thus exceeded.

It has become known heretofore to minimize the aforementioned torque-generating impacts by bringing the two machine elements with separate drives to approximately the same rotational speed, so that only a slight differential speed exists between the coupling or clutch halves. For a precisely positioned coupling operation, however, a consequence thereof is that the time interval for implementing the specific relative positioning of the two coupling halves, under certain circumstances, becomes very long. If one of the machine elements has a rotational speed of 3000 rpm, and the other machine element has a rotational speed of 3001 rpm, for example, in a most unfavorable case, it may take almost a minute before a correct relative position for coupling becomes available.

For registration of the angular difference between the rotating machine elements, on the one hand, and the jaw clutch halves, on the other hand, it is no problem, in light of the current state of the electronics art, to find a solution with a suitably high electronics outlay or expense. It is possible, for example, to use two incremental transmitters or absolute transmitters with digital processing. The outlay, in particular from the financial aspect, as well, is always very great, so that such a solution is generally not implemented and, consequently, equal-phase or in-phase coupling is not performed and, in this respect, the torque-generating impact loading imposed on the clutch and also on the related equipment is taken into consideration.

It is, accordingly, an object of the invention to provide a clutch device for phase-synchronous coupling of rotating machine elements which has a relatively simple and economical construction yet enables an exact engagement of the clutch so as to afford a coupling which is substantially free of any torque-generating impact.

With the foregoing and other objects in view, there is provided, in accordance with the invention, a clutch device for phase-synchronous coupling of rotating machine elements, comprising two coding elements, respectively, co-rotatable with two driven machine elements, a sensor fixed in position adjacent the coding elements, the coding elements having codings thereon which are variable in angular position with respect to the sensor, the sensor having means for registering information composed from respective codings of the two coding elements, and a clutch control unit connected to the sensor for receiving the information therefrom.

Because the two machine elements are each provided with a drive, the coupling or engagement of the clutch device can occur at a position or setting in which the two rotating machine elements do not have a differential speed, and also assume an exact angular position relative to one another. In order to be able to register and implement these relationships, coding elements co-rotating with the respective machine elements are provided, which preferably assume a neighboring position to one another. Therefore, one coding element is assigned to one machine element, and the other coding element to the other machine element. The two coding elements have codings which change in relation to the angular position; the codings are distributed, respectively, over the circumferences of the coding elements, information composed form the two codings being registered by a sensor.

A consequence thereof, is that, both in the case of differential speeds between the coding elements and, thus, also between the respective machine elements, as well as in the case of different positions relative to one another, other information-forming data are constantly being registered by the sensor. To this extent, only when quite specific information is available, is there any assurance that the two coding elements and machine elements, respectively, will have the same speed and also the relative position to one another necessary for the coupling. If this specific information is available a moment or torque-free, phase-synchronous coupling can be performed. The coupling or clutch function itself which, for example, may be performed electromagnetically, is triggered by the clutch control unit which evaluates the information. Because no particular requirements are made with respect to the formation of the codings, it being necessary only for them to be registered by a suitable sensor corresponding to them, and for a coding change which is dependent upon angular position to be present, various solutions may be realized, which may, however, be performed by the relatively simplest of means.

Solutions have indeed become known heretofore in the state of the art, which are concerned with the registration of the angular position of a rotating component, but which, however, do not challenge or seize on the coupling problem upon which the invention of the instant application is based. In the state of the art, the evaluation of a co-rotating coding element does occur, but in such a case, it is always an individual coding, and not information composed of various codings, which is processed. Thus, German Published Non-Prosecuted Application (DE-OS) 29 43 493 discloses a device for controlling a platen movement, which has a coding disk formed with crowns or circles of holes and connected to the platen, the circles of holes being scanned by an optical stage formed of two sensors and two receivers. Even when there is a manual adjustment of the platen, the angular position thereof is always communicated thereby to the mechanical drive. German Published Non-Prosecuted Application (DE-OS) 23 43 648 discloses an electrical subfractional-horsepower motor having a co-rotating coding formed of alternating fields of differing reflective capability. A fixed scanning device responds optically to the varying reflective capabilities of these fields. Thus, the rotational speed and/or angular position of the motor shaft can be obtained.

In accordance with another feature of the invention, the coding elements are formed as coding disks disposed opposite and parallel to one another. This arrangement facilitates a tightly neighboring position, one which is advantageous to the scanning of the information composed from the two codings of the coding elements.

In accordance with a further feature of the invention, the coding disks are circular disks.

In accordance with an added feature of the invention, the codings comprise openings formed in the coding disks.

In accordance with an alternate feature of the invention, the openings are holes formed in the coding disks.

In accordance with an additional feature of the invention, the openings are open-edged recesses formed in the coding disks.

This type of coding can be produced by a simple stamping process of the circular disks which may be formed of metal or of suitable plastic material.

In order to produce the dependence of the codings upon angular position, in accordance with yet another feature of the invention, the openings are of different sizes.

In accordance with yet a further feature of the invention, openings uniformly distributed over the circumference of the coding disks increase in size consecutively counterclockwise in the circumferential direction of the coding disks.·

In accordance with yet an alternate feature of the invention, the openings uniformly distributed over the circumference of the coding disks decrease in size consecutively counterclockwise in the circumferential direction of the coding disks.

In the course of one revolution of the coding elements, holes and recesses, respectively, which continuously increase and decrease in size, respectively, are thus located opposite the sensor, to which extent, data dependent upon the angular position is supplied.

In accordance with yet an added feature of the invention, the two coding disks, respectively, have like codings in a like arrangement. This construction permits a precise registration of the difference in rotational speeds, as well as a recognition of the relative angular position of the two coding disks because, according to the invention, the information composed of the two codings is registered and evaluated.

In accordance with yet an additional feature of the invention, the sensor is an optical sensor having at least one light source directed towards the codings, and at least one light receiver disposed so as to receive light from the codings.

In accordance with an alternate feature of the invention, the light source is disposed opposite an outer side of one of the coding elements, and the light receiver is disposed opposite an outer side of the other coding element.

Thus, the device works in accordance with the transmitted light principle, that is, light originating from the light source passes the holes and recesses, respectively, of the coding elements consecutively, and then, appropriately evaluated, reaches the light receiver.

In accordance with an alternate feature of the invention, the codings are formed of light reflection fields having at least one characteristic of different sizes and different reflective strengths and, assigned to each of the coding elements, is a light source directed towards the codings, and a light receiver for registering light reflected from the codings. To this extent, the reflection principle is realized. The light reflection fields of different sizes influence the reflected quantity of light, so that dependence on angular position is created. This applies correspondingly to fields reflecting with different intensities.

In accordance with a further feature of the invention, the sensor is constructed as an inductively operating sensor having induced flux cooperating with the codings of the coding elements. If the holes and recesses, respectively, of the two coding disks pass the induced flux, a result thereof will be the formation of corresponding changes in the magnetic field. These changes are registered and correspondingly evaluated.

In accordance with an added feature of the invention, there is provided a clutch constructed as a jaw clutch. The invention is not limited to such a construction; rather, any clutch may be used which facilitates a connection at a precise angular position.

In accordance with an additional feature of the invention, one of the machine elements is a driven shaft of a printing machine, and the other machine element is a drive shaft of an imprint unit. In this regard, the printing machine is particularly a web or sheet-fed printing machine.

When printing brochures, for example, very high print runs are produced, different editions of the brochure being nevertheless desired. The individual editions are differentiated by additional imprints produced by an imprinter, e.g. company and address details for various dealers. In order not to have to interrupt the operation of the printing machine performing the main printing work for each new dealer imprint, which would not only result in loss of time, but also considerable waste or discards, the imprinter performing the appropriate additional imprinting is switched on during operation. This is effected phase-synchronously i.e. with in-phase synchronism, and with precise positioning with a jaw clutch constructed in accordance with the invention, the imprinter being initially brought to an appropriate rotational speed with a separate drive and, then, after producing a phase-synchronous position or setting, the two machine elements are coupled. The printing machine performing the main printing work can then operate with several imprinters, free of interruption.

In accordance with yet another feature of the invention, the clutch control unit includes an integrator for receiving information fed thereto from the sensor as an input value.

In accordance with another aspect of the invention, the method of operating a clutch comprises integrating in the integrator information fed thereto over a given time period by the sensor.

In accordance with another mode of the method according to the invention, the given time period over which the information is fed to the integrator by the sensor is that of a revolution of one of the machine elements. Depending upon the rotational speed and the angular position of the two coding elements, a corresponding integration result is established. This is compared with a set value. when the set value and the integration result are equal, the desired, phase-synchronous relative positioning of the two halves of the coupling exists, so that the coupling function or clutch engagement may be initiated, preferably by electromagnetic means.

Thus, in accordance with a further mode of the invention, the method includes comparing the integration result with a set value and, if it is equal to the set value, initiating a clutch action. Alternatively, however, another evaluation is possible, wherein the clutch control unit determines a pulse/pause ratio produced by the codings, which results from the scanning of the coding elements. When the pulse/pause ratio is equal to a set ratio, which corresponds to the desired phase-synchronous coupling position or setting, the coupling function or clutch engagement is initiated.

Thus, in accordance with an alternate and concomitant mode of the invention, the method includes evaluating with the clutch control unit a pulse/pause ratio produced by the codings, and, if the pulse/pause ratio is equal to a set ratio, initiating a clutch action.

Other features which are considered as characteristic for the invention are set forth in the appended claims.

Although the invention is illustrated and described herein as embodied in a jaw clutch device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIGS. 4 to 6 are plot diagrams of information obtained from a sensor and composed of the codings of two adjacent coding elements;

Figure 1:
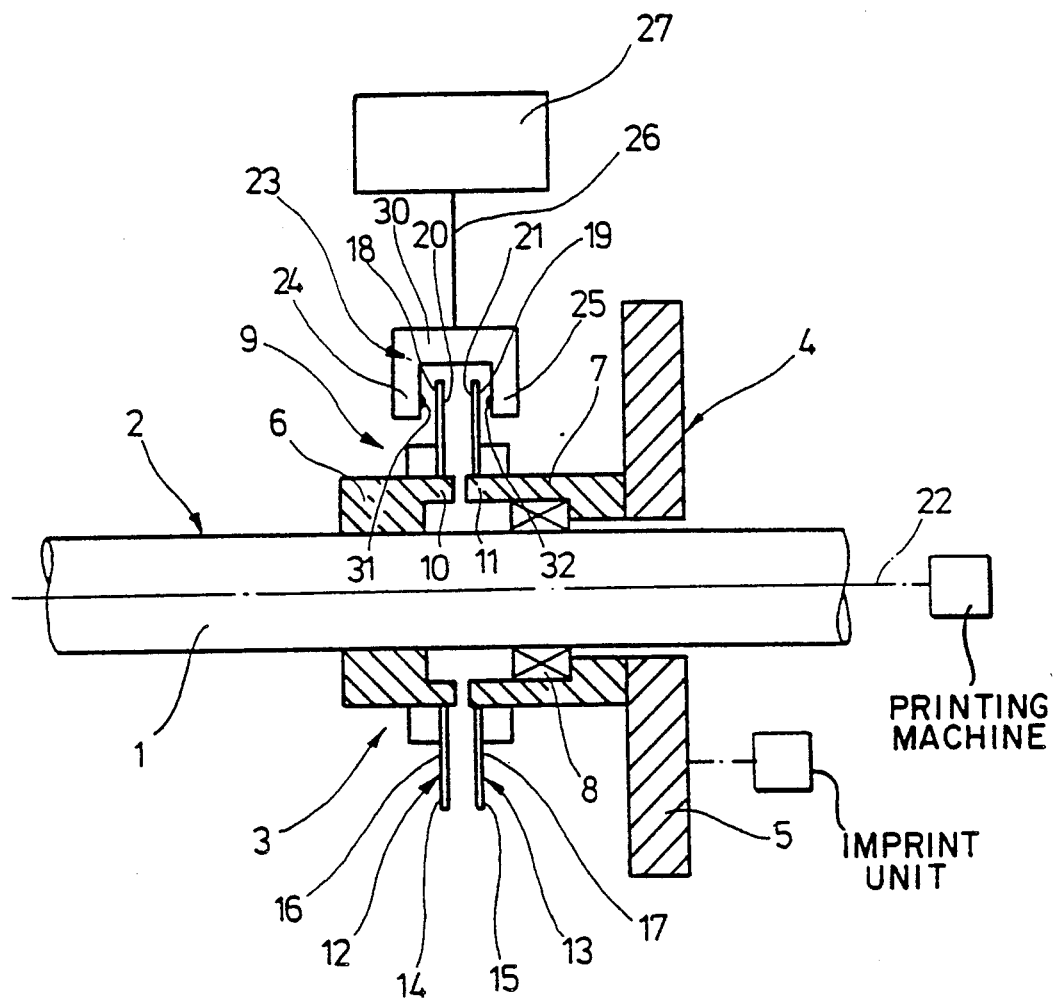
FIG. 1 is a diagrammatic and schematic elevational view, partly in section of a clutch device constructed in accordance with the invention.

Referring now to the drawing and, first, particularly to FIG. 1 thereof, there is shown therein a section of a driven shaft 1 of a printing machine. The driven or output shaft 1 thus represents a rotating machine element 2. It is driven by a non-illustrated drive unit of the printing machine.

The driven shaft 1 is able to be coupled with another machine element 4 by means of a clutch 3, the machine element 4 representing a drive shaft 5 or a drive component of a non-illustrated imprint unit or imprinter, so that the imprint unit can be driven via the driven shaft 1 of the printing machine when the clutch 3 is engaged.

The clutch 3 is formed of two clutch halves 6 and 7. The clutch half 6 is connected to the driven shaft 1 so as to be fixed against rotation relative thereto. The clutch half 7 is supported on the driven shaft 1 by means of a ball bearing 8. The clutch 3 is constructed as a toothed or jaw clutch 9. Thus, on the clutch half 6 thereof, it has a toothing 10 which cooperates with a corresponding opposed or countertoothing 11 on the clutch half 7. The toothing 10 and the counter-toothing 11 are constructed in such a manner that clutch engagement therebetween is possible only when there is a specific relative position between the driven shaft 1 and the drive shaft 5. In order to effect the specific clutch positioning, a non-illustrated electromagnetically operating device is provided, which produces an axial displacement of at least one of the clutch halves 6 and 7, respectively, so that the toothing 10 engages with the counter-toothing 11. In FIG. 1, the disengaged or decoupled position of the clutch 3 is illustrated.

A coding element 12 is disposed through the intermediary of the clutch half 6 on the machine element 2, fixed against relative rotation therewith, and is situated adjacent to a coding element 13, which is similarly connected via the clutch half 7 to the machine element 4 so as to be fixed against relative rotation therewith. The coding elements 12 and 13 are constructed as coding disks 14 and 15 which ar disposed opposite and parallel to one another. They have a circular outline and thus constitute circular disks 16 and 17, respectively. Outer sides 18 and 19, respectively, as well as opposing inner sides 20 and 21, respectively, of the coding disks 14 and 15 are disposed in planes extending perpendicularly to an axis of rotation 22 of the driven shaft 1.

Furthermore, a fixed-position sensor 23 is provided, which has a U-shaped form, so that its arms 24 and 25 lie opposite the outer sides 18 and 19, respectively, of the respective coding disks 14 and 15. The sensor 23 is connected via a lead 26 with a clutch control unit 27, which cooperates with the aforementioned non-illustrated electromagnetic clutch actuation unit.

Figure 2:
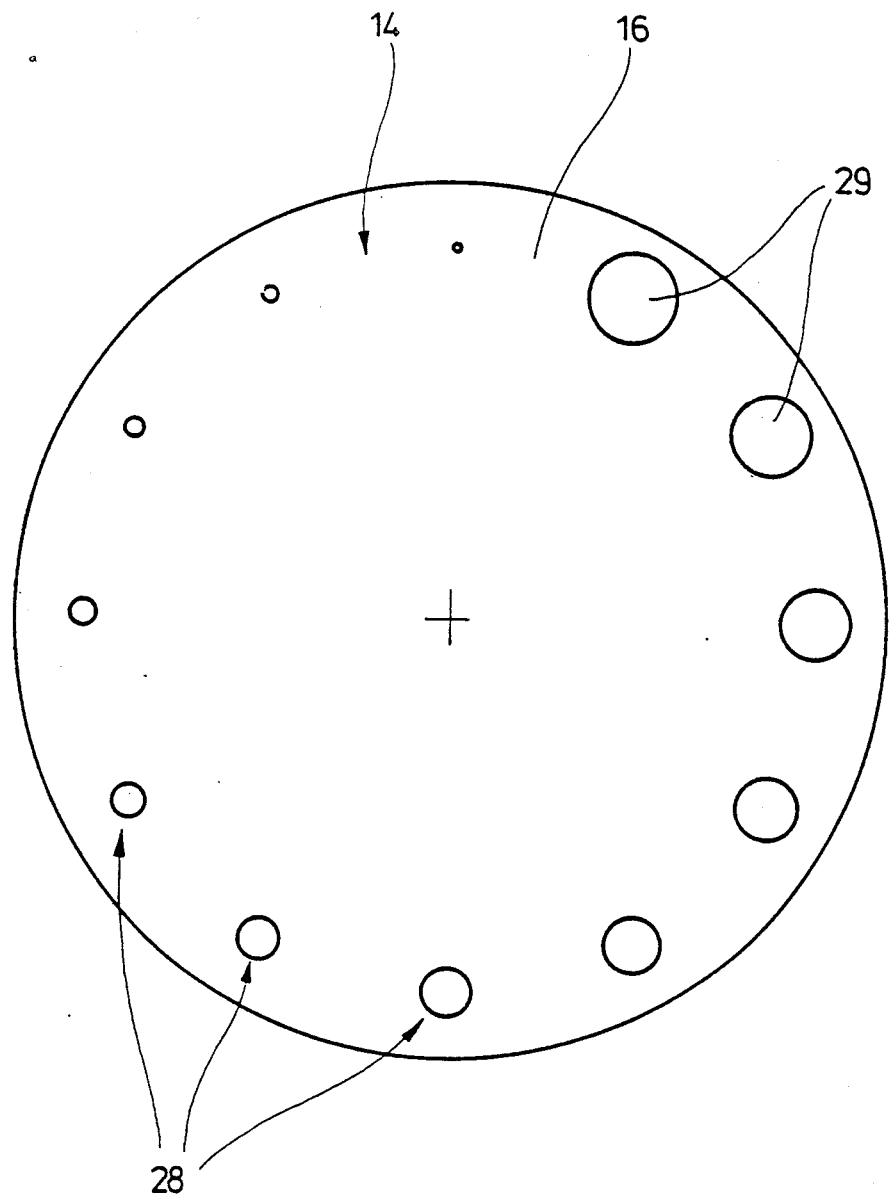
FIG. 2 is a top plan view of a coding element of the clutch device constructed as a perforated disk.

The coding disks 14 and 15 are of identical construction. According to FIG. 2, then have the same codings 28 which are formed of openings or apertures 29. The apertures 29 are disposed with respect to one another at locations offset by like rotary angles in the circumferential direction of the circular disks 14 and 15, the size of the apertures or openings 29, respectively, increasing counterclockwise, starting from a 12 o'clock position, as viewed in FIG. 2. Preferably, the opening or apertures 29 are constructed as circular holes with suitably different diameters.

The two coding disks 14 and 15 are assembled so that, when the clutch 3 is engaged, they are located opposite one another in accordance with the desired phase synchronism. This means that respective holes 29 of like diameters which are formed in the coding disks 14 and 15, respectively, are disposed in alignment opposite one another.

The sensor 23 is constructed as an optical sensor 30. A light source 31 is provided in the arm 24 of the optical sensor 30, and a light receiver 32 in the arm 25 thereof, so that the respective holes 29 of the two coding disks 14 and 15 lie on an imaginary connecting line between the light source 31 and the light receiver 32.

The device according to the invention operates in the following manner: if the non-illustrated imprint unit which is connected to the machine element 4 is also to be operated during the printing operation of the printing machine, the clutch 3 must be engaged in order to perform a phase-synchronous operation of both units. To this end, the following procedure is exercised in order to perform a clutch operation which is free of torque-producing impact: by means of a non-illustrated separate drive, which need only to be designed for short-term loading, the non-illustrated imprint unit and, accordingly, the drive shaft 5 therefor, is brought to a rotational speed which corresponds substantially to the rotational speed of the driven or output shaft 1 of the printing machine. Therefore, only a very minimal relative speed exists between the two machine elements 2 and 4. It is, accordingly, an objective of the invention to bring the differential or relative speed down to 0 and simultaneously, to perform the clutch operation, in a phase-synchronous, specific relative position. Both the difference in rotational speed of the two machine elements 2 and 4, as well as the relative position thereof to one another, are detected or registered by the optical sensor 30 based upon the codings 28 of the coding disks 14 and 15. For this purpose, the information supplied by the optical sensor 30 is fed to the clutch control unit 27 via the lead or line 26, and is evaluated correspondingly.

Based upon the aforementioned special form of the codings 28, and dependent upon the relative position of the coding disks 14 and 15, the light receiver 32 receives a suitable signal. This is contingent upon how much light from the light source 31 is permitted to pass through the openings 29. The clutch control unit 27 has an integrator, which integrates the information originating from the optical sensor 30 over a time period of one revolution of the machine element 2. According to the invention, the information resulting from the codings 28 of the two coding disks 14 and 15 is accordingly evaluated. The resultant integration value becomes greater, the closer the two coding disks 14 and 15 come to their specific phase-synchronous relative position, which facilitates the coupling, because the quantity of light received by the light receiver 32 increases accordingly.

A maximum integration value exists when the phase-synchronous position has been reached. This is illustrated in FIGS. 4 to 6, wherein FIG. 4 shows the sensor signal having an amplitude U dependent upon or as a function of the angle of rotation $\alpha$ of the machine element 2. The two coding disks 14 and 15 assume therein the same speed and specific relative position to one another necessary for the coupling, so that a phase-synchronous coupling can be effected with the clutch 3.

Whenever suitable perforations or openings 29 release the light beam of the light source 31, the light receiver 32 receives a pulse. This is always the case at the beginning of the angular positions 0 degrees, 30 degrees, 60 degrees, and so forth, according to the distribution of the angular positions of the openings or holes 29, the pulse length t increases as the angle of rotation $\alpha$ increases. The sum of the areas within the pulses of one revolution from 0° to 360° corresponds to the integration result of the integrator. This is a maximum value in the coupling or clutch position of the clutch 3. The presence of the coupling or clutch position can, to this extent, be determined in a simple manner by the fact that the clutch control unit 27 has a set value in memory, which is compared with the integration result. When the set value is equal to the integration result, the coupling function is triggered. When there are differences in rotational speed and/or impermissible relative angles, the integration result is always smaller than when the phases are alike. Thus, FIG. 5 illustrates an example wherein one coding disk 14 rotates twice as fast as the other coding disk 15. A consequence thereof is that specific pulses, in comparison with those of FIG. 4, do not occur at all and, in addition, the pulse lengths t are smaller. In FIG. 6, one coding disk 14 only has half the rotational speed of that of the other coding disk 15. Thus, in this regard, a pulse is registered every 30° and, consequently, smaller pulse lengths t are present, so that, the integration result altogether is smaller than in comparison with that of FIG. 4.

According to a further non-illustrated embodiment, it is also possible for the clutch control unit 27 to evaluate a pulse/pause ratio effected by the codings. Thus, the pulses shown in FIGS. 4 to 6 are examined with respect to their pulse/pause ratio, which is preferably performed digitally.

Figure 3:
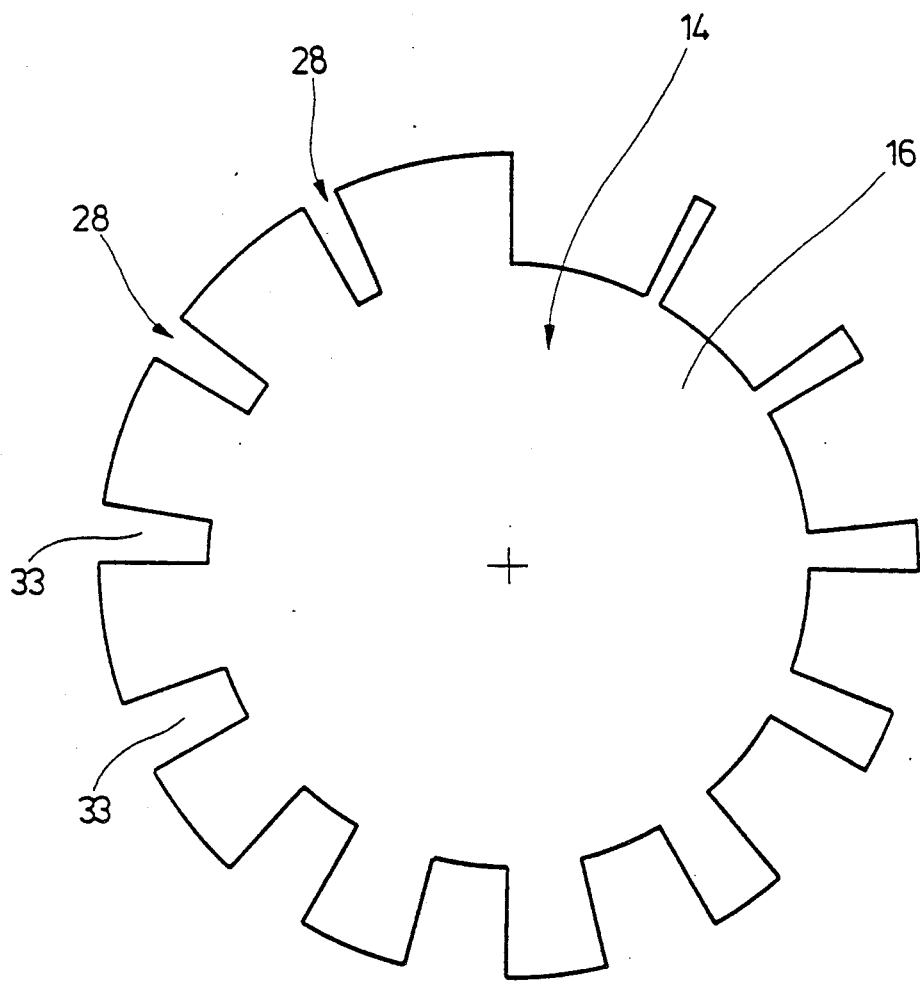
FIG. 3 is a top plan view of another embodiment of the coding element.

In accordance with another embodiment of the invention, the codings 28 can also be constructed as open-edged recesses 33, as shown in FIG. 3, the clearance or inner width thereof increasing and diminishing, respectively, in the circumferential direction of the circular coding disks 14 and 15, respectively, depending upon the direction of view.

It is possible, furthermore, for an optical sensor 30 which does not operate in accordance with the afore-described transmitted light-principle, to be used as the sensor 23, but instead, a sensor which, though also optical, operates in accordance with a light reflection-principle. For this purpose, each coding element has light-reflection fields of different sizes and/or different strengths of reflecting properties. In addition, to each coding element, there is assigned both a light source directed at the codings, and also a receiver registering the reflected light. From the foregoing, it is apparent that the total information composed from the two light-receivers constantly changes, depending upon the relative position of the two coding disks. In this case, also, an integration can then take place, it being necessary for a maximum integration result to be provided in order to implement the coupling.

It is also possible that the sensor 23 is constructed as an inductively operating sensor. This means that an induced flux lies between its two arms 24 and 25, the induced flux being influenced by or as a result of the codings 28 (e.g. the holes 29), and thus provides information which can be evaluated by the clutch control unit 27.

Figure 7A:
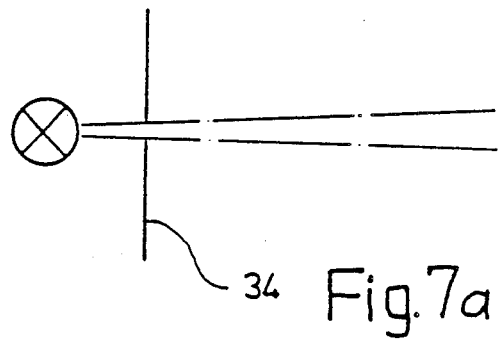
FIGS. 7a and 7b are, respectively, a diagrammatic representation of an optical sensor provided with an apertured partition or diaphragm, and a diagram of an output signal associated therewith.
Figure 7B:
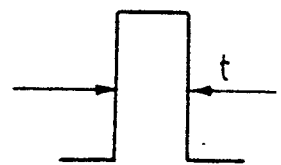
Figure 8A:
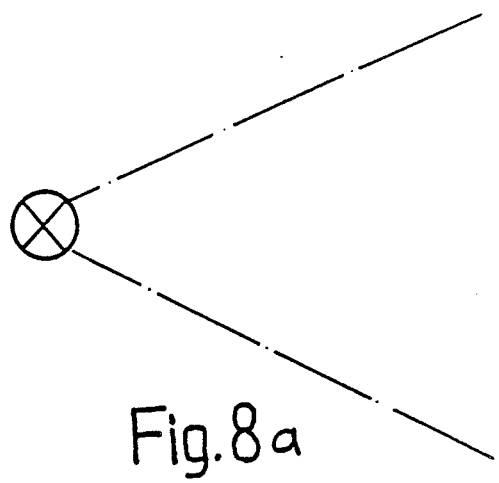
FIGS. 8a and 8b are, respectively, a diagrammatic representation of a sensor with a non-bunched or non-bundled light beam, as well as a diagram of an output signal associated therewith.
Figure 8B:
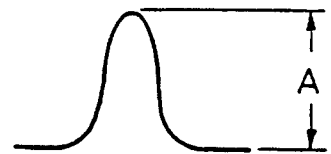

If the optical sensor 30 produces a tightly bunched or bundled light beam which, for example, can be effected by means of a diaphragm 34 (FIG. 7), the resultant sensor output value is a pulse which is of substantially rectangular shape. The pulse length t is a function of the size of the coding 28 which permits the light beam to pass therethrough. In FIG. 8, the light beam of the optical sensor 30 is not bunched or bundled. The output signal of the sensor has a "rounded" shape. The shape of the output signal is not only dependent upon a diaphragm or a lens, but also upon the quality of the transmitting/receiving unit. With a correspondingly high electronics outlay, it is possible to obtain a perfect signal even without a diaphragm, because the coding disks also have a diaphragm effect. Moreover, with the reflection principle, as well, a rectangular signal can be achieved by means of suitable electronic outlay. In the case of "rounded" signals, the evaluation can also be effected by means of the amplitude A of the respective pulse.

The simple construction (simple perforated disks) for the coding elements 12 and 13, which can also be true for the sensor 23 (simple light transmitting/receiving unit), together with the uncomplicated evaluation (integrator) result in an especially economical solution. The clutch 3 is engaged and disengaged precisely and without differential speed, that is, without any torque impacts. Insofar as any increase in the dynamics of the device should occur, this is possible by means of the number of codings disposed around the circumference of the coding disks 14 and 15. For example, the number of holes 29 can also be increased, so that, without loss of quality, the measurement time can be reduced.

Figure 9:
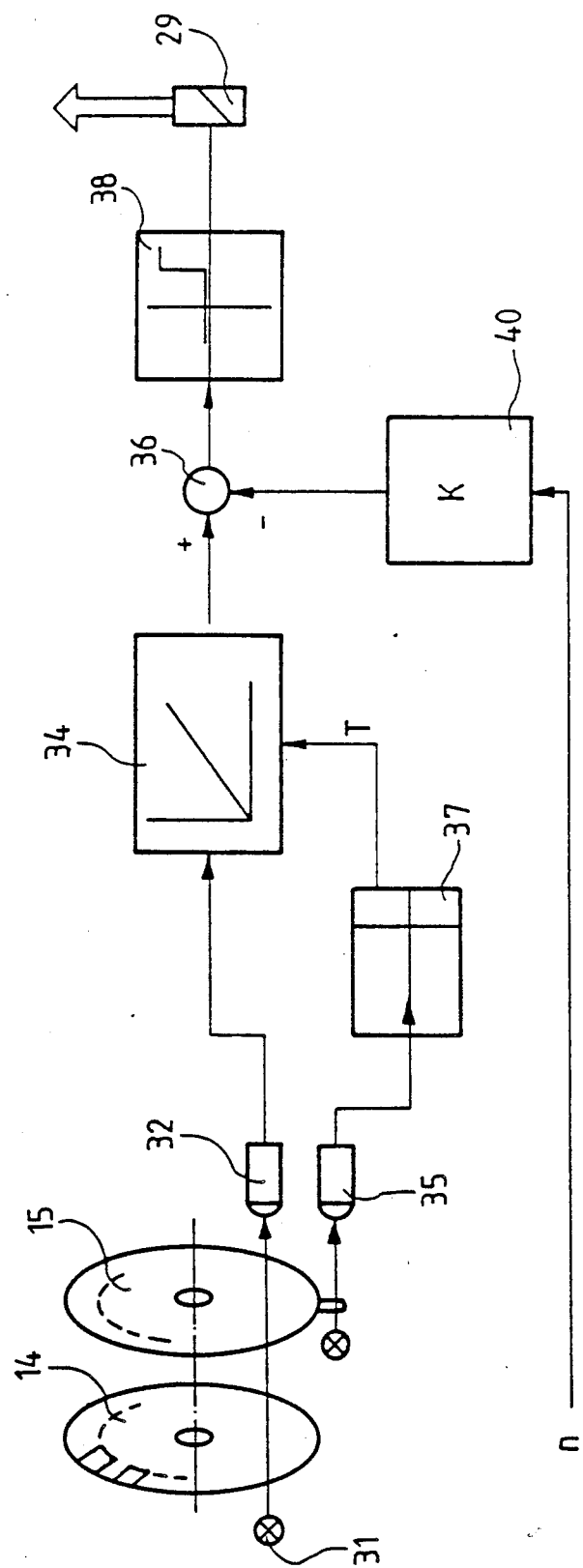
FIG. 9 is a block diagram of a control system for the clutch device according to the invention.

In an embodiment of the control unit 27, as shown in FIG. 9, a signal originating with a sensor 23 serving as a light barrier is fed to an integrator 34. For each revolution of a coding disc 15, the integrator 34 is started by a second track on the coding disc 15 which has only one pulse per revolution. This starting pulse for the integrator 34 can be interrogated, for example, by an optical unit 35. The integration result is compared with a given value k n (constant k times nominal rotary speed n) in a comparator 36. Because the integration result is dependent upon the clock time given by the light barrier 35 and a clock transmitter 37, the given value provided at 40 must be controlled so as to be dependent on rotary speed for the comparator 36. If the prescribed threshold is reached by the integration result in the threshold device 38, it means phase synchronism, and the clutch is engaged by the coil 39 and, in the core of pneumatic clutches, by a solenoid value, respectively.

I claim:

1. Clutch device for phase-synchronous coupling of rotating machine elements, comprising two coding elements, respectively, co-rotatable with two driven machine elements, a sensor fixed in position adjacent said coding elements, said coding elements having codings thereon which are variable in angular position with respect to said sensor, said sensor having means for registering information composed from respective codings of said two coding elements, a clutch control unit connected to said sensor for receiving said information therefrom, and means controlled by said clutch control unit for coupling the rotating machine elements at one specific predetermined position relative to one another.

2. Device according to claim 1, wherein said coding elements are formed as coding disks disposed opposite and parallel to one another.

3. Device according to claim 2, wherein said coding disks are circular disks.

4. Device according to claim 3, wherein said coding comprise openings formed in said coding disks.

5. Device according to claim 4, wherein said openings are holes formed in said coding disks.

6. Clutch device for phase-synchronous coupling of rotating machine elements, comprising two coding elements, respectively, co-rotatable with two driven machine elements, a sensor fixed in position adjacent said coding elements, said coding elements having codings thereon which are variable in angular position with respect to said sensor, said sensor having means for registering information composed from respective codings of said two coding elements, and a clutch control unit connected to said sensor for receiving said information therefrom, said codings comprising open-edged recesses formed in said coding disks.

7. Device according to claim 4, wherein each of the circular disks has a circumference, and said openings are distributed uniformly over the circumference of said coding disks.

8. Clutch device for phase-synchronous coupling of rotating machine elements, comprising two coding elements, respectively, co-rotatable with two driven machine elements, a sensor fixed in position adjacent said coding elements, said coding elements having codings thereon which are variable in angular position with respect to said sensor, said sensor having means for registering information composed from respective codings of said two coding elements, and a clutch control unit connected to said sensor for receiving said information therefrom, said codings comprising openings formed in said coding disks, said openings being of different sizes.

9. Clutch device for phase-synchronous coupling of rotating machine elements, comprising two coding elements, respectively, co-rotatable with two driven machine elements, a sensor fixed in position adjacent said coding elements, said coding elements having codings thereon which are variable in angular position with respect to said sensor, said sensor having means for registering information composed from respective codings of said two coding elements, and a clutch control unit connected to said sensor for receiving said information therefrom, said circular disks having a circumference, said codings comprising openings formed in said coding disks, said openings being uniformly distributed over the circumference of said coding disks and increasing in size consecutively counterclockwise around the circumference of said coding disks.

10. Clutch device for phase-synchronous coupling of rotating machine elements, comprising two coding elements, respectively, co-rotatable with two driven machine elements, a sensor fixed in position adjacent said coding elements, said coding elements having codings thereon which are variable in angular position with respect to said sensor, said sensor having means for registering information composed from respective codings of said two coding elements, and a clutch control unit connected to said sensor for receiving said information therefrom, said circular disks having a circumference, said codings comprising openings formed in said coding disks, said openings being uniformly distributed over the circumference of said coding disks and decreasing in size consecutively counterclockwise around the circumference of said coding disks.

11. Device according to claim 2, wherein said two coding disks, respectively, have like codings in a like arrangement.

12. Device according to claim 1, wherein said sensor is an optical sensor having at least one light source directed towards said codings, and at least one light receiver disposed so as to receive light from said codings.

13. Device according to claim 12, wherein said light source is disposed opposite an outer side of one of said coding elements, and said light receiver is disposed opposite an outer side of the other coding element.

14. Clutch device for phase-synchronous coupling of rotating machine elements, comprising two coding elements, respectively, co-rotatable with two driven machine elements, a sensor fixed in position adjacent said coding elements, said coding elements having codings thereon which are variable in angular position with respect to said sensor, said sensor having means for registering information composed from respective codings of said two coding elements, and a clutch control unit connected to said sensor for receiving said information therefrom, said codings being formed of light reflection fields having at least one characteristic of different sizes and different reflective strengths and, assigned to each of said coding elements is a light source directed towards said codings, and a light receiver for registering light reflected from said codings.

15. Clutch device for phase-synchronous coupling of rotating machine elements, comprising two coding elements, respectively, co-rotatable with two driven machine elements, a sensor fixed in position adjacent said coding elements, said coding elements having codings thereon which are variable in angular position with respect to said sensor, said sensor having means for registering information composed from respective codings of said two coding elements, and a clutch control unit connected to said sensor for receiving said information therefrom, said sensor being constructed as an inductively operating sensor having induced flux cooperating with said codings of said coding elements.

16. Device according to claim 1, comprising a clutch constructed as a jaw clutch.

17. Clutch device for phase-synchronous coupling of rotating machine elements, comprising two coding elements, respectively, co-rotatable with two driven machine elements, a sensor fixed in position adjacent said coding elements, said coding elements having codings thereon which are variable in angular position with respect to said sensor, said sensor having means for registering information composed from respective codings of said two coding elements, and a clutch control unit connected to said sensor for receiving said information therefrom, one of said machine elements being a driven shaft of a printing machine, and the other machine element being a drive shaft of an imprint unit.

18. Clutch device for phase-synchronous coupling of rotating machine elements, comprising two coding elements, respectively, co-rotatable with two driven machine elements, a sensor fixed in position adjacent said coding elements, said coding elements having codings thereon which are variable in angular position with respect to said sensor, said sensor having means for registering information composed from respective codings of said two coding elements, and a clutch control unit connected to said sensor for receiving said information therefrom, said clutch control unit including an integrator for receiving information fed thereto from said sensor as an input value.

19. Method of operating a clutch device for phase-synchronous coupling of rotating machine elements, comprising two coding elements, respectively, co-rotatable with two driven machine elements, a sensor fixed in position adjacent said coding elements, said coding elements having codings thereon which are variable in angular position with respect to said sensor, said sensor having means for registering information composed from respective codings of said two coding elements, and a clutch control unit connected to said sensor for receiving said information therefrom, said clutch control unit including an integrator for receiving information fed thereto from said sensor as an input value, which comprises integrating in the integrating information fed thereto over a given time period by the sensor.

20. Method according to claim 19, wherein the given time period over which the information is fed to the integrator by the sensor is that of a revolution of one of said machine elements.

21. Method according to claim 19, which includes, comparing the integration result with a set value and, if it is equal to the set value, initiating a clutch action.

22. Method according to claim 19, which includes evaluating with the clutch control unit a pulse/pause ratio produced by the codings, and, if the pulse/pause ratio is equal to a set ratio, initiating a clutch action.

* * * * *